Sept. 26, 1961 H. C. BOBER ET AL 3,001,456
MILLING MACHINE CUTTER
Filed Aug. 14, 1959

INVENTORS.
HENRY C. BOBER
CHARLES A. BOBER
BY
ATTORNEY.

United States Patent Office 3,001,456
Patented Sept. 26, 1961

3,001,456
MILLING MACHINE CUTTER
Henry C. Bober and Charles A. Bober, both of 253 Fairview St., New Britain, Conn.
Filed Aug. 14, 1959, Ser. No. 833,800
1 Claim. (Cl. 90—11)

This invention relates to milling machines and is directed more particularly to an adjustable apparatus for increasing the width of cut of a milling machine cutter.

When a milling cutter is used for a long period of time for machining slots in flat or cylindrical work pieces, it becomes worn so that it is too small for producing the proper width of cut. Hence, it has heretofore been customary to use paper or metal shims on opposite sides of the worn cutter to tilt it, whereby an increased width of cut of about .003 inch could be obtained. This expedient not only was makeshift and difficult to set up, but was also subject to change in adjustment under the large stresses of cutting.

It is accordingly the principal object of this invention to provide an adjustable apparatus for tilting a milling cutter on its arbor through a small angle with respect to the perpendicular to the axis of the arbor to increase the width of cut.

Another object of this invention is to provide an adjustable apparatus of the above nature whereby an increased width of cut of a milling cutter of as much as .010 inch can be obtained with accuracy and dependability.

A more particular object is to provide a novel adjustable apparatus of the character described, which comprises a pair of cylindrical collet members having inner adjacent inclined faces which are adapted to abut against the opposite sides of a milling cutter on an arbor, and including means for twisting one of said collet members with respect to the other for variably adjusting the tilt of said milling cutter.

A further object is to provide an adjustable apparatus of the above nature in which the inclined inner face of each collet member is provided on one side with an outer flat section perpendicular to the axis of the arbor which when aligned will hold the cutter in normal untilted position for providing the minimum width of cut.

Still another object of the invention is to provide an adjustable apparatus of the above nature which will be inexpensive to manufacture, easy to use, fool-proof, and long wearing in operation.

Other objects, features, and advantages of the invention will be apparent from the following description when read with reference to the accompanying drawing.

In the drawing, wherein like reference numerals denote corresponding parts throughout the several views.

Figure 5:
FIG. 5 is a perspective view of the locking key, shown separately.

Referring now in detail to the drawings, in which like reference numerals denote corresponding parts throughout the several views, the numeral 10 (FIG. 1, 2, 3 and 4) designates an ordinary milling cutter having peripheral teeth 11 and a central opening 11a provided with a key slot 12. The milling cutter 10 is rigidly secured on an arbor 14 of a milling machine by means of a rectangular key 13 (FIG. 5) located within a key slot 15 in said arbor and the key slot 12 in said milling cutter 10.

The present invention includes a fixed cylindrical collet member 16 having a central opening 16a, provided with a key slot 16b for locking said fixed collet member to the arbor 14 by means of the key 13.

The invention also includes an adjustable loose twistable cylindrical collet member 17, having a weight-reducing counterbore 17a at its inner end and provided with a central cylindrical opening 17b surrounding the arbor 14. A nut 18 at the outer end of the collet 17 serves to lock the collet member 17 in adjusted position, against the milling cutter 10, as hereinbelow described.

The collet members 16, 17 are each machined with inclined inner faces 23, 24, having tapers of .0035 to .010 inch, respectively, for example. The collet members 16, 17 are also provided on the outer portions of their end faces with flat segments 25, 26 respectively, which are perpendicular to the arbor axis, and when they are in alignment with each other abut flatly against the milling cutter 10 (FIG. 3) to hold it in normal position for producing the minimum width of cut.

The fixed collet member 16 is rigid on the arbor 14, being locked thereto by the key 13, whereas the loose collet member 17, having no key, may be twisted manually to any desired rotative position with respect to said fixed collet member 16, where it will be held securely by tightening the nut 18. It will be clear that the twisting of the loose collet member 17 will change the inclination or tilt of the milling cutter 10 with respect to the arbor 14 from a maximum inclination, shown in FIG. 2 to zero inclination, as shown in FIG. 3.

Figure 1:
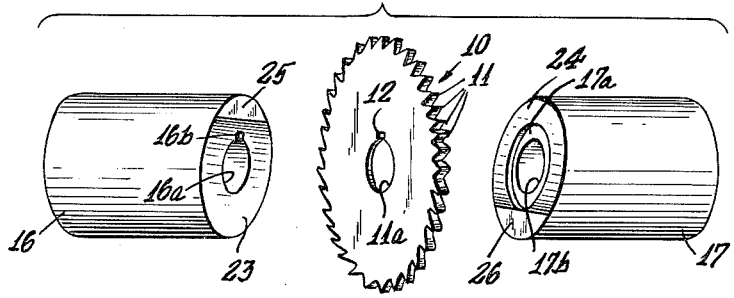
FIG. 1 is an "exploded" perspective view illustrating the two collet members and the interposed milling cutter arranged for maximum width of cut.
Figure 2:
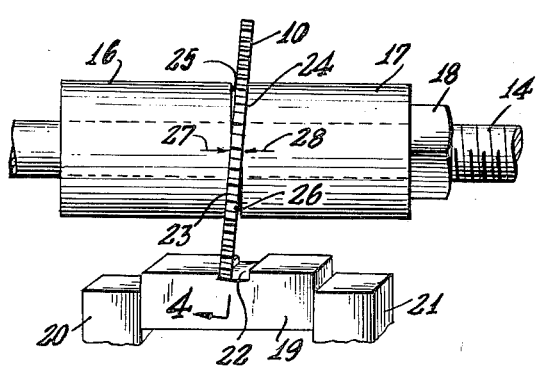
FIG. 2 is a side view of the same in assembled position and showing a slot being milled in a work piece, the latter being shown in perspective.
Figure 3:
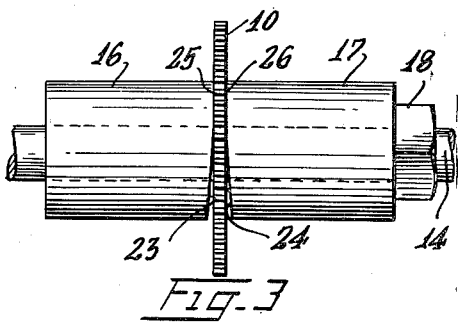
FIG. 3 is a similar side view of the same, showing the twistable collet adjusted for minimum cut.
Figure 4:
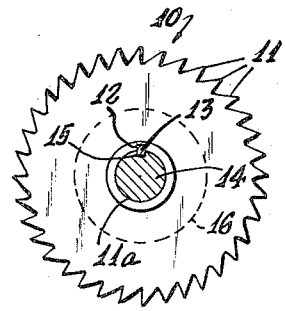
FIG. 4 is a vertical cross-sectional view, taken along the line 4—4 of FIG. 2, in the direction of the arrows, illustrating the appearance of the milling cutter.

FIG. 2 illustrates a work piece 19, in the form of a metal block, held between vise jaws 20, 21, in which a recess 22 is being cut of maximum width.

By means of the present invention, it is possible to increase the width of cut in the work piece up to about .010 inch or more greater than normal cut.

As a means of visually indexing the rotative position of the collet member 17, arrows 27, 28 are provided on the collets 16, 17 respectively, by means of which the machine operator can determine the adjusted position of the rotary collet 17 and hence the amount of cut to be expected.

This invention may conveniently be employed on arbors of various sizes, and it is contemplated that collets could conveniently be sold in sets of three pairs, having tapers of .003 inch, .006 inch, and .009 inch, respectively—the .003 inch taper to be used for the largest cut and the .009 inch taper for the smallest.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claim.

Having thus fully described the invention, what is claimed as new and for which it is desired to secure Letters Patent is:

In a milling machine, a milling cutter, a pair of cylindrical collet members adapted to be mounted in spaced relation on an arbor for supporting said milling cutter therebetween, said arbor having a driving engagement with said cutter, one of said collet members being fixed on said arbor, and the other collet member being twistable with respect to said arbor, means to keep said other collet member in adjusted abutment with said cutter, the adjacent inner surfaces of said collet members having inclined portions adapted to abut opposite sides of said cutter for tilting it to enable machining of a wider cut by the cutter than the normal cutting width, said inner surfaces of said collet members each having additional flat segment portions which are operative, when in alignment, to flatly abut the opposite faces of said milling cutter to hold it at right angles to the axis of said arbor at zero inclination to produce the normal minimum width of cut.

References Cited in the file of this patent

UNITED STATES PATENTS

| | | |
|---|---|---|
| 45,677 | Rogers | Dec. 27, 1864 |
| 300,322 | Kress | June 10, 1884 |
| 1,358,533 | Elston | Nov. 9, 1920 |
| 2,544,814 | Warren | Mar. 13, 1951 |

FOREIGN PATENTS

| | | |
|---|---|---|
| 61,976 | Switzerland | July 31, 1912 |